United States Patent
Kawakami et al.

(10) Patent No.: US 11,194,219 B2
(45) Date of Patent: Dec. 7, 2021

(54) OPTICAL MODULATOR

(71) Applicant: NIPPON TELEGRAPH AND TELEPHONE CORPORATION, Tokyo (JP)

(72) Inventors: Hiroto Kawakami, Tokyo (JP); Hiroshi Yamazaki, Tokyo (JP); Yutaka Miyamoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/981,651

(22) PCT Filed: Mar. 19, 2019

(86) PCT No.: PCT/JP2019/011497
§ 371 (c)(1),
(2) Date: Sep. 16, 2020

(87) PCT Pub. No.: WO2019/188597
PCT Pub. Date: Oct. 3, 2019

(65) Prior Publication Data
US 2021/0096440 A1    Apr. 1, 2021

(30) Foreign Application Priority Data
Mar. 27, 2018   (JP) .............................. JP2018-060787

(51) Int. Cl.
*G02F 1/21*      (2006.01)
*G02F 1/225*     (2006.01)

(52) U.S. Cl.
CPC .............. *G02F 1/212* (2021.01); *G02F 1/225* (2013.01)

(58) Field of Classification Search
None
See application file for complete search history.

(56) References Cited

U.S. PATENT DOCUMENTS

2015/0261059 A1*   9/2015   Yamazaki .......... H04B 10/5051
                                                    385/3

FOREIGN PATENT DOCUMENTS

EP    3364622 A1    8/2018
JP    2017083626 A  5/2017
(Continued)

OTHER PUBLICATIONS

S. Li et al., "Highly linear radio-over-fiber system incorporating a single-drive dual-parallel Mach-Zehnder modulator," Photon. Technol. Lett., vol. 22, pp. 1775-1777, Dec. 2010.
(Continued)

*Primary Examiner* — Chad H Smith
(74) *Attorney, Agent, or Firm* — Harness, Dickey & Pierce, P.L.C.

(57) ABSTRACT

An optical modulator according to embodiments includes a first MZI and a second MZI each including a first optical coupler that splits CW light into two, a second optical coupler that couples the CW light split by the first optical coupler and outputs the CW light, and a bias electrode that adjusts a phase of the CW light split by the first optical coupler, a third optical coupler that couples outputs of the first MZI and the second MZI with at a predetermined ratio and outputs the light, and a bias adjustment circuit that adjusts an output voltage of a bias power supply applied to a bias electrode so that an optical path length difference between the CW light beams split by the first optical coupler is a predetermined times a carrier wavelength under a condition that an output of a differential output amplifier is a zero level, in accordance with an operating mode of the own apparatus.

6 Claims, 11 Drawing Sheets

(56) References Cited

FOREIGN PATENT DOCUMENTS

WO    WO-2014050123  A1    4/2014
WO    WO-2017079871  A1    5/2017

OTHER PUBLICATIONS

Yamazaki et al., Optical Modulator With a Near-Linear Field Response, Journal of Lightwave Technology, Aug. 15, 2016, vol. 34, No. 16. pp. 3796-pp. 3802.

Kawakami et al., Novel Optimizing Technique for Linear Optical Mach-Zehnder Modulator and Its Experimental Verification using PAM-8 Signal, 2018 European Conference on Optical Communication (ECOC), Sep. 23, 2018, pp. 1-pp. 3, DOI: 10. 1109/ECOC. 2018.8535459.

International Search Report issued in PCT/JP2019/011497, dated Jun. 11, 2019; ISA/JP.

* cited by examiner

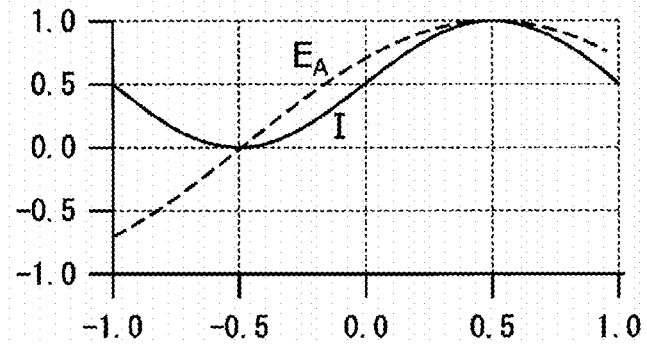
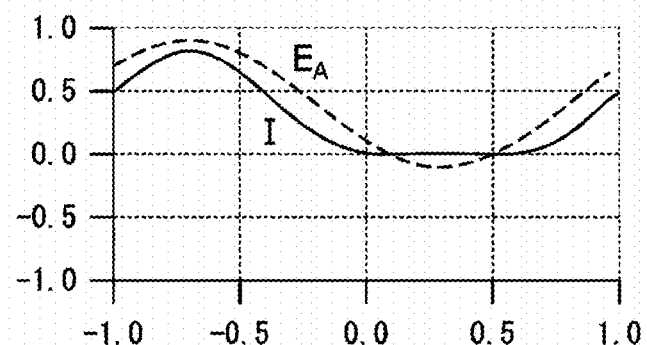
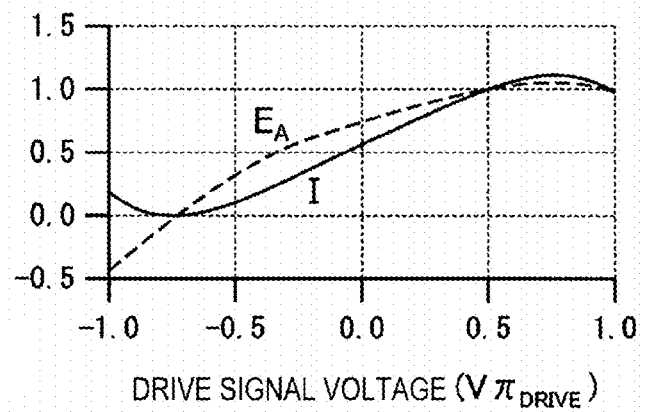
FIG. 2

(A) OPTICAL PHASE DIFFERENCE OF MAIN MZI IS BIASED TO +0.5 λ (POINT E)
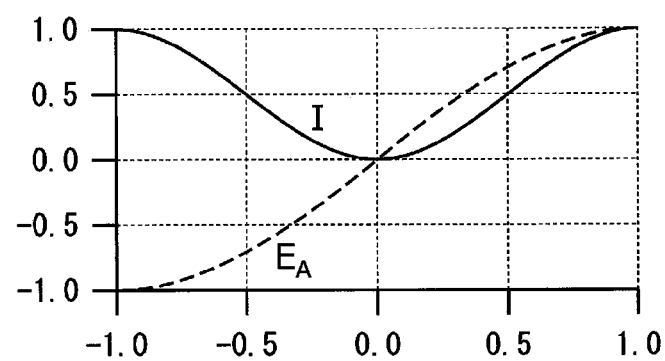
(B) OPTICAL PHASE DIFFERENCE OF CORRECTION MZI IS BIASED TO +0.5 λ (POINT H)
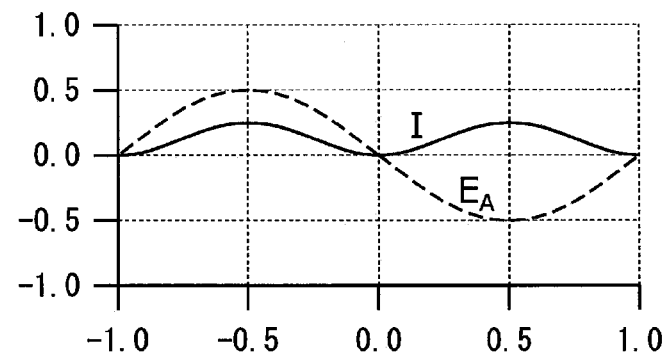
(C) MODULATOR OUTPUT PORT (MAIN SIGNAL + 0.3 × CORRECTION SIGNAL)
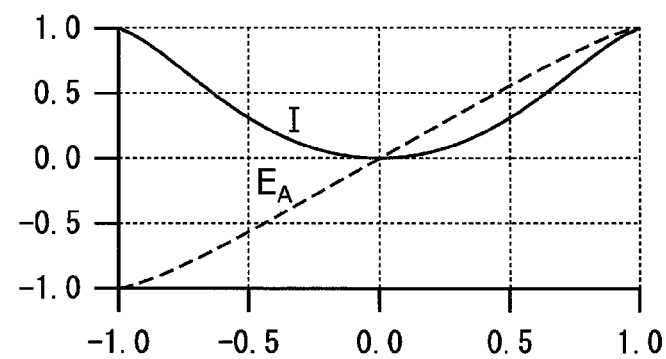
DRIVE SIGNAL VOLTAGE ($V\pi_{DRIVE}$)
FIG. 3

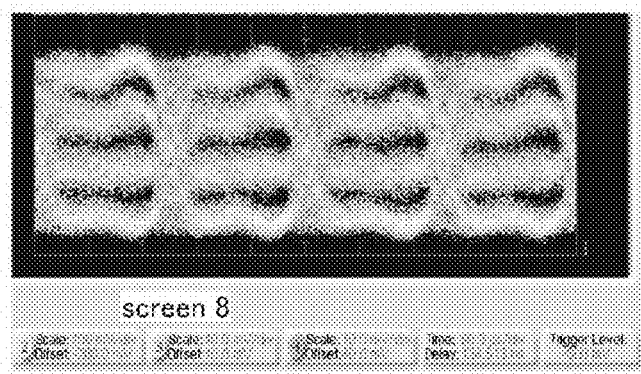
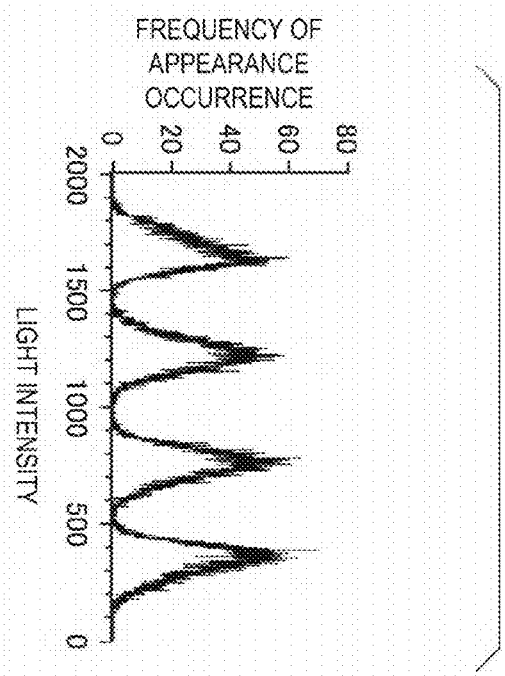
FIG. 4
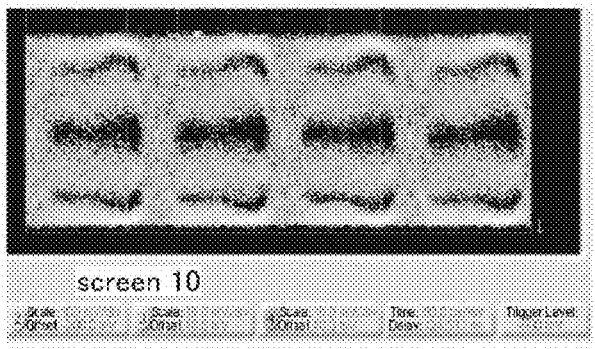
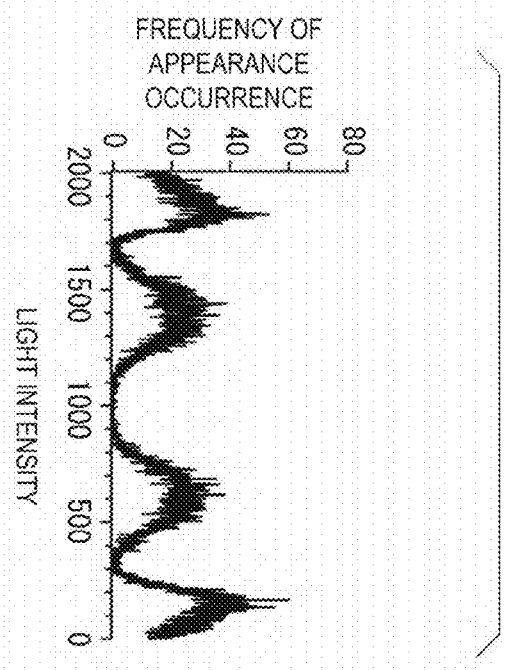
FIG. 5

(A) UPPER LIMIT AND LOWER LIMIT OF DRIVE AMPLITUDE ARE ±0.7 $V\pi_{DRIVE}$

| BIAS OF MAIN MZI | 0.5 λ | 0.25 λ | 0.25 λ | -0.25 λ | -0.25 λ | 0.25 λ | 1.25 λ | 1.25 λ | 0.25 λ |
|---|---|---|---|---|---|---|---|---|---|
| LOGIC INVERSION OF MAIN AND CORRECTION | NONE | NONE | YES | NONE | YES | NONE | NONE | NONE | NONE |
| BIAS OF CORRECTION MZI | (0.5 + 0.05) λ | (0.5 + 0.05) λ | (0.5 - 0.05) λ | (0.5 - 0.05) λ | (0.5 + 0.05) λ | (0.5 + 0.05) λ | (0.5 + 0.05) λ | (1.5 + 0.05) λ | (1.5 + 0.05) λ |
| COUPLING RATIO OF ASYMMETRIC COUPLER | 1 TO 0.4 | 1 TO 0.4 | -1 TO 0.4 | 1 TO 0.4 | -1 TO 0.4 | 1 TO 0.4 | 1 TO 0.4 | -1 TO 0.4 | -1 TO 0.4 |

(B) UPPER LIMIT AND LOWER LIMIT OF DRIVE AMPLITUDE ARE ±$V\pi_{DRIVE}$

| BIAS OF MAIN MZI | 0.5 λ | 0.5 λ | -0.5 λ | -0.5 λ | 0.5 λ | 0.5 λ | -0.5 λ | -0.5 λ |
|---|---|---|---|---|---|---|---|---|
| LOGIC INVERSION | NONE | YES | NONE | YES | NONE | YES | NONE | YES |
| BIAS OF CORRECTION MZI | 0.5 λ | 0.5 λ | 0.5 λ | 0.5 λ | -0.5 λ | -0.5 λ | -0.5 λ | -0.5 λ |
| MAIN ARM TO CORRECTION ARM | 1 TO 0.3 | -1 TO 0.3 | 1 TO 0.3 | -1 TO 0.3 | -1 TO 0.3 | 1 TO 0.3 | -1 TO 0.3 | 1 TO 0.3 |

FIG. 6

UPPER LIMIT AND UPPER LIMIT OF DRIVE AMPLITUDE ARE APPROXIMATELY ±0.7 V$\pi$

FIRST LINEAR OPTICAL MODULATOR

| BIAS OF MAIN MZI | 0.25 λ | 0.25 λ | -0.25 λ | -0.25 λ | 1.25 λ | 1.25 λ | 1.25 λ | 0.25 λ |
|---|---|---|---|---|---|---|---|---|
| LOGIC INVERSION OF MAIN AND CORRECTION | NONE | YES | NONE | YES | NONE | YES | NONE | NONE |
| BIAS OF CORRECTION MZI | (0.5 + 0.05) λ | (0.5 - 0.05) λ | (0.5 - 0.05) λ | (0.5 + 0.05) λ | (0.5 + 0.05) λ | (0.5 - 0.05) λ | (1.5 + 0.05) λ | (1.5 + 0.05) λ |
| COUPLING RATIO OF ASYMMETRIC COUPLER | 1 TO 0.4 | -1 TO 0.4 | 1 TO 0.4 | -1 TO 0.4 | 1 TO 0.4 | -1 TO 0.4 | -1 TO 0.4 | -1 TO 0.4 |

SECOND LINEAR OPTICAL MODULATOR

| BIAS OF MAIN MZI | 0.5 λ | 0.5 λ | -0.5 λ | -0.5 λ | 0.5 λ | 0.5 λ | -0.5 λ | -0.5 λ |
|---|---|---|---|---|---|---|---|---|
| LOGIC INVERSION | NONE | YES | YES | NONE | YES | NONE | NONE | YES |
| BIAS OF CORRECTION MZI | 0.5 λ | 0.5 λ | 0.5 λ | -0.5 λ | -0.5 λ | -0.5 λ | -0.5 λ | -0.5 λ |
| MAIN ARM TO CORRECTION ARM | 1 TO 0.3 | -1 TO 0.3 | 1 TO 0.3 | -1 TO 0.3 | 1 TO 0.3 | -1 TO 0.3 | -1 TO 0.3 | 1 TO 0.3 |

FIG. 8

OPTICAL MODULATOR

CROSS-REFERENCE TO RELATED APPLICATIONS

This application is a 371 National Stage of International Application No. PCT/JP2019/011497, filed on Mar. 19, 2019, which claims priority to Japanese Patent Application No. 2018-060787, filed Mar. 27, 2018. The entire disclosures of the above applications are incorporated herein by reference.

TECHNICAL FIELD

The present disclosure relates to a technology of improving an amplitude of a data signal and an optical electric field or a linearity between the data signal and a light intensity in an optical transmitter using a Mach-Zehnder interferometer (MZI).

BACKGROUND ART

In an optical transmission system with high-speed and a large capacity, how a large amount of data in a unit time is transmitted is important. Research has actively been done on a wavelength multiplexing technology in which signals having a plurality of wavelengths are transmitted simultaneously in parallel in the same optical fiber, a spatial multiplexing technology in which a plurality of signals are transmitted in parallel by using a plurality of cores arranged in the same optical fiber, or a technology of realizing high-speed large-capacity optical transmission by a combination of the technologies.

Even by using these techniques, it is necessary to generate an optical modulation signal by modulating the light intensity or the optical electric field by using a certain wavelength as a carrier. In order to generate a high-speed optical modulation signal, it is common to use a combination of a continuous wave (CW) light source which generates unmodulated light and an optical modulator connected to the output side of the CW light source. There are a plurality of types of optical modulators, but an MZI type optical modulator capable of performing a high-speed operation is widely used.

In an optical modulation signal in the related art, there is only a binary state representing two values of an on-state and an off-state of light, and 1 are 0 of bits correspond to the optical modulation signal. Meanwhile, in recent years, in order to realize a large capacity, the light intensity or an amplitude of the optical electric field is modulated with a value of $2^n$ (n is a natural number), and multi-level modulation representing n bits is becoming mainstream. For example, in a case of n=3, a value of $8(=2^n)$ is associated with (0, 0, 0), (0, 0, 1), (0, 1, 0), (0, 1, 1), (1, 0, 0), (1, 0, 1), (1, 1, 0), and (1, 1, 1), and 3 bits of information may be represented by a single wavelength carrier.

Here, the terms of "amplitude of optical electric field" and "light intensity" will be described. A state of an optical modulation signal modulated to a digital signal changes according to a symbol rate, but the optical modulation signal can be regarded as CW light within a time sufficiently shorter than a symbol period. An optical electric field E of the CW light can be expressed as the following mathematical relationship (1) with a frequency of the CW light as f, a time as t, and an initial phase of light as $\varphi$[rad].

[Math. 1]

$$E = E_A \times \cos(2\pi \times f \times t + \varphi) \tag{1}$$

Where $E_A$ represents an amplitude of an optical electric field. Here, the right side of the mathematical relationship (1) can be described as the following mathematical relationship (2). Thus, in the following, a phase change by $\pi$ due to a propagation delay on a modulator or an optical waveguide is expressed as "a sign of the amplitude $E_A$ of the optical electric field is reversed", in some cases.

[Math. 2]

$$E_A \times \cos(2\pi \times f \times t + \varphi) = -E_A \times \cos(2\pi \times f \times t + \varphi) \tag{2}$$

Which sign is considered positive depends on the definition, but in the optical modulation signal, a relative change in the phase of light is important, and it is not important which is defined as positive.

In the CW light, a light intensity I is proportional to the square of the amplitude $E_A$ of the optical electric field, but $E_A$ for the modulation light is also modulated in accordance with the symbol rate. An average light intensity at a time sufficiently longer than the symbol period may be expressed as "light intensity of modulation light", but hereinafter, it is assumed that the light intensity I represents an average instantaneous intensity at a time sufficiently shorter than the symbol period. Thus, in the following description, a value of the light intensity I indicates a value that always changes depending on the symbol rate.

In a case where the light intensity I or the amplitude of the optical electric field $E_A$ is modulated with a value of $2^n$, the symbol is differentiated by providing threshold values having types of $2^n-1$ and determining a size relationship between these threshold values and the light intensity or the optical electric field, but it is desirable that intervals between the threshold values are equal. This is because, when the interval between certain two threshold values is narrow, a transmission error due to noise is likely to occur in a symbol in a modulation state corresponding to between the threshold values. In addition, in a case where the intervals between the threshold values is not uniform, a complex identification circuit corresponding to the threshold values having non-uniform intervals is required in a receiver, which makes design difficult.

In a case where the intervals between the threshold values are equal, it is necessary to pay attention to non-linearity of the optical modulator. In a case where an MZI type optical modulator performs multi-level modulation, a multi-level electrical signal is usually amplified to generate a drive signal, and the drive signal is supplied to the MZI type optical modulator to generate a multi-level optical modulation signal, but in general, a voltage of the drive signal is not linearly proportional to the light intensity I of the optical modulation signal or the amplitude $E_A$ of the optical electric field. Hereinafter, the reasons will be described with reference to FIG. 9 to FIG. 13.

FIG. 9 is a diagram illustrating a configuration example of an MZI type optical modulator 90 in the related art. CW light output from a CW light source is split into two types by a first optical coupler C1. Here, one is referred to as a P-side arm, and the other is referred to as an N-side arm. A P-side arm MP and an N-side arm MN are respectively disposed with a P-side drive signal electrode RP and an N-side drive signal electrode RN.

The P-side drive signal electrode RP and the N-side drive signal electrode RN change a phase of the CW light propagated through the P-side arm MP or the N-side arm MN depending on a voltage applied to each. Whether the phase advances or is delayed depends on a configuration of the modulator, but here the phase is delayed in a case where a positive voltage is applied, and the phase advances in a case where a negative voltage is applied.

In general, in an MZI type optical modulator, a bias electrode is arranged to finely adjust an optical path length of the P-side arm or the N-side arm. FIG. 9 illustrates an example in which the bias electrode RB is disposed on the P-side arm MP. A bias voltage is applied to the bias electrode RB by a bias power supply PS to finely adjust a phase of the CW light propagated through the P-side arm.

The P-side arm and the N-side arm are coupled by a second optical coupler C2. Here, for the purpose of the following description, the second optical coupler C2 is a two-input two-output type coupler. Two ports on the output side are the same as a configuration of an optical waveguide, but for reasons to be described below, one is referred to as an output port, and the other is referred to as an inverting output port, hereinafter.

Next, a drive system of the MZI type optical modulator 90 will be described. An electrical signal supplied as a data signal to the MZI type optical modulator 90 is amplified in a differential output amplifier AM and input to the P-side drive signal electrode RP and the N-side drive signal electrode RN. The differential output amplifier AM outputs the amplified electrical signal to one of the drive signal electrodes, and outputs an electrical signal obtained by inverting a sign of the electrical signal to the other drive signal electrode. The two output data signals have a waveform having the same amplitude while being reversed from each other. In the following, these two data signals are collectively referred to as "drive signal".

The drive signals are applied to the P-side drive signal electrode RP and the N-side drive signal electrode RN. When a voltage applied to the P-side drive signal electrode RP is Vp, a voltage applied to the N-side drive signal electrode RN is –Vp. Here, a value obtained by subtracting the voltage applied to the N-side drive signal electrode RN from the voltage applied to the P-side drive signal electrode RP is defined as "drive signal voltage". That is, in the above example, the drive signal voltage is 2 Vp. Vp may be positive or negative, and a phase of light propagated through the P-side arm and the N-side arm is modulated by the drive signal in a push-pull scheme.

A high-speed operation is required for the differential output amplifier AM, so that a bandwidth of the differential output amplifier AM is generally wide-bandwidth, but a signal near a Direct Current (DC) component is generally blocked on a circuit arrangement, so that the drive signal voltage varies positively and negatively around zero (GND). Hereinafter, an amplitude of the variation in the drive signal voltage is referred to as "drive amplitude".

An optical path length difference between the P-side arm MP and the N-side arm MN can vary depending on the drive signal voltage or bias voltage. In general, a half-wavelength voltage means the amount of change in a voltage required to change an optical path length difference by half of a wavelength of the CW light, and is expressed as Vπ. Vπ in the drive signal voltage and Vπ in the bias voltage are generally different, the former is described below as $V\pi_{DRIVE}$, and the latter is described as $V\pi_{BIAS}$, and they are distinguished. According to a signal format and a configuration of an apparatus, a drive signal may be applied to only one of the drive signal electrodes rather than the push-pull scheme, but the description is omitted as the problem to be solved by the present disclosure is not directly related to the problem.

FIG. 10 are a set of graphs schematically illustrating light output from the output port ($P_N$ illustrated in FIG. 9) of the MZI type optical modulator 90 in the related art. The graphs (A) to (E) in FIG. 10 respectively illustrate the light output in a case where the drive signal voltages are different from each other. The solid line represents light passing through the P-side arm (hereinafter, referred to as "light P"), and the dashed line represents light passing through the N-side arm (hereinafter, referred to as "light N"). A difference between $t_2$ and $t_0$ in the drawing corresponds to an inversed number of an optical frequency of the CW light (independent of the symbol rate).

The graph (C) in FIG. 10 illustrates light P and light N in a case where the drive signal voltage is 0. A phase difference between the two is determined by a difference between an optical path length of the P-side arm and an optical path length of the N-side arm, but here, is finely adjusted by the bias voltage so that a value obtained by subtracting a phase of the light N from a phase of the light P in a case where the drive signal voltage is 0 is $+\pi/2$[rad]. This phase difference is $0.25\lambda$ when converted to a carrier wavelength $\lambda$. In the following, applying such a bias voltage is expressed as "phase difference is biased to $+\pi/2$" or "optical path length difference is biased to $+0.25\lambda$".

The graphs (D) and (E) in FIG. 10 illustrate the light P and the light N in a case where a voltage of the drive signal is positive. In this case, a phase of the light P is delayed and a phase of the light N advances, so that a phase difference between the two decreases and a light intensity of the output port increases. In particular, when the drive signal voltage is $+V\pi_{DRIVE}/2$ (the graph (E) in FIG. 10), the phases coincide with each other, so that an absolute value of the amplitude $E_A$ of the optical electric field of interference light at the output port is maximized, and the light intensity I is also maximized.

The graphs (A) and (B) in FIG. 10 illustrate the light P and the light N in a case where the voltage of the drive signal is negative. In this case, the phase of the light P advances and the phase of the light N is delayed, so that a phase difference between the two increases and the light intensity of the output port decreases. In particular, when the drive signal voltage is $-V\pi_{DRIVE}/2$ (the graph (A) in FIG. 10), the phases are opposite to each other, the amplitude $E_A$ of the optical electric field of the interference light at the output port becomes zero, and the light intensity I is also zero and becomes extinct.

In a range of the drive amplitude voltage illustrated in FIG. 10, the phases of the light is controlled in a push-pull scheme on the P-side and the N-side, so that an intensity of the interference light at the output port $P_N$ is always valley at $t_2$ and $t_0$, and is always mountain at $t_1$. Thus, a phase of the interference light is always constant. On the other hand, in the outside of the range illustrated in FIG. 10 (for example, in a case where the drive signal voltage is slightly smaller than $-V\pi_{DRIVE}/2$), peaks and valleys of waveforms at $t_2$ and $t_0$ and $t_1$ are reversed, so that the phase is changed by $\pi$. As described above, this corresponds to the reversal of the sign of the amplitude $E_A$ of the optical electric field.

That is, in order to generate a light intensity modulation signal by using the MZI type optical modulator 90 in the related art illustrated in FIG. 9, an optical path length difference may be biased to $+0.25\lambda$ and upper and lower limits of the drive signal voltage may be respectively set to $+V\pi_{DRIVE}/2$ and $-V\pi_{DRIVE}/2$. In this case, a drive amplitude becomes $V\pi_{DRIVE}$, and in an amplitude exceeding this, a turning-back occurs in the light intensity I. Here, the turning-back means that the light intensity changes from increasing to decreasing or from decreasing to increasing.

FIG. 11 is a graph showing the amplitude $E_A$ of the optical electric field and the light intensity I output from the output port $P_N$ as a function of the drive signal voltage. The dashed line represents the amplitude $E_A$ of the optical electric field, and the solid line represents the light intensity I. The horizontal axis represents the drive signal voltage normalized with $V\pi_{DRIVE}$, and the vertical axis represents the amplitude and light intensity of the optical electric field. For simplicity, in FIG. 11, a proportional coefficient of the amplitude of the optical electric field and the light intensity, which are not essential in the description, are omitted in FIG. 11. The amplitude $E_A$ of the optical electric field does not have linearity with respect to the drive signal voltage and has a sinusoidal response. The light intensity I is proportional to the square of the amplitude of the optical electric field, but the square of a sine wave is also sinusoidal, so that the light intensity I also does not have linearity with respect to the drive signal voltage.

Although the light output from the output port $P_N$ illustrated in FIG. 9 is described above, the light output from the other inverting output port $P_R$ indicates optical electric field different from the light output from the output port $P_N$ even though the drive signal voltages and the bias voltages are the same. This is because the difference between the phase of the light P and the phase of the light N differs by $\pi$ between the output port $P_N$ and the inverting output port $P_R$. That is, in the output port $P_N$ and the inverting output port $P_R$, an intensity of the output light is reciprocally changed. Thus, when the intensity of the output light of the output port $P_N$ is maximum, the intensity of the output light of the inverting output port $P_R$ is minimized, and a size relationship is reversed.

Here, the light output from the output port $P_N$ in FIG. 9 will be considered again. In order to output a light intensity modulation signal of four values (for example, a Pulse-Amplitude Modulation (PAM) signal of four values) from the output port $P_N$, a data signal of four values may be amplified to generate a drive signal of four values. In one example, the four values of the drive signal can be selected as $D4=+V\pi_{DRIVE}/2$, $D3=+V\pi_{DRIVE}/6$, $D2=-V\pi_{DRIVE}/6$, and $D1=-V\pi_{DRIVE}/2$.

FIG. 12 illustrates a specific example of four levels L1 to L4 of a light intensity obtained at this time. In this example, intervals of L1 to L2 and L3 to L4 are narrower as compared with an interval between L2 to L3, so when a Signal to Noise Ratio (SNR) after transmission is low, a determination error frequently occur in between L1 and L2 and between L3 and L4.

Thus, it is desirable that the intervals of the four levels L1 to L4 are equal. For this, a technology is known in which a drive amplitude (=D4−D1) is reduced and a linear region of a sine wave having superior linearity is used to make each interval be equal intervals. In this method, there is no concentration of errors in a specific symbol, but there is a problem in that an error rate is increased overall due to narrow intervals between threshold values when determining the levels at all symbols.

While the above description relates to light intensity modulation, multi-level modulation of the amplitude $E_A$ of the optical electric field is also widely performed. For example, in optical Quadrature Amplitude Modulation (QAM), a plurality of MZI type optical modulators are combined in a nest type, and the amplitude $E_A$ of the optical electric field is multi-level-modulated for each of two types of carriers for which phases are orthogonal. In this case, a plurality of levels including negative values are provided for the amplitude of the optical electric field. The negative optical electric field is realized by inverting the phase as described above. An In-phase-quadrature (I-Q) modulator, which is nowadays and widely used as a generator for optical QAM signals, also modulates the amplitude $E_A$ of the optical electric field with a combination of a plurality of MZI type optical modulators in the related art as illustrated in FIG. 9.

The modulation of the amplitude $E_A$ of the optical electric field can be performed by biasing an optical path length difference to $0.5\lambda$ rather than $0.25\lambda$ (expressed as "biasing to null point" in some cases) and respectively setting upper and lower limits of the drive signal voltage to $+V\pi_{DRIVE}$ and $-V\pi_{DRIVE}$. FIG. 13 is a graph showing a specific example of the light intensity I or the amplitude $E_A$ of the optical electric field in this case.

A maximum value of the drive amplitude is $2V\pi_{DRIVE}$, and when the maximum value is exceeded, a turn-back occurs at the amplitude $E_A$ of the optical electric field. As described above, the amplitude $E_A$ of the optical electric field also performs a sinusoidal response to the drive signal voltage in the same manner as the light intensity I, and thus a non-linearity problem occurs. Such a problem may be solved by using an optical modulator such that the light intensity I of the output light or the amplitude $E_A$ of the optical electric field responds linearly to the drive signal voltage.

Although such an optical modulator cannot be realized with a simple MZI type optical modulator as illustrated in FIG. 9, a method is proposed for improving linearity by combining optical modulators having more complex configurations. For example, an optical modulator capable of improving linearity of the light intensity I with respect to a drive signal voltage is proposed in Non-Patent Literature 1, and a modulator capable of improving linearity of the amplitude $E_A$ of an optical electric field with respect to a drive signal voltage is proposed in Non-Patent Literature 2 and Patent Literature 1.

CITATION LIST

Patent Literature

Patent Literature 1: WO 2014/050123

Non Patent Literature

Non Patent Literature 1: S. Li other, "Highly linear radio-over-fiber system incorporating a single-drive dual-parallel Mach-Zehnder modulator", Photon. Technol. Lett., vol. 22, pp. 1775 to 1777, December 2010.

Non Patent Literature 2: H. Yamazaki other, "Optical Modulator With a Near-Linear FieldResponse" J. Lightw. Technol., vol. 34, no. 16, pp. 3796 to 3801, August 2016.

SUMMARY OF THE INVENTION

Technical Problem

Meanwhile, the technology in the related art described above has a problem in that as the technology in the related art is adapted to only one of improving linearity of the amplitude $E_A$ of the optical electric field and improving linearity of the light intensity I, the improvements in both cannot be realized at the same time.

Once manufactured, it is difficult to change the configuration of the optical circuit inside the optical modulator. Thus, in a case of transmitting a signal format (for example, a multi-level PAM signal) in which linearity of light intensity is important, an optical modulator having the configuration described in Non Patent Literature 1 or the like is used, and in a case of transmitting a signal format (for example, a multi-level QAM signal) in which linearity of an amplitude of an optical electric field is important, an optical modulator having the configuration described in Non Patent Literature 2, Patent Literature 1, or the like is used.

In view of the above, an object of the present disclosure is to provide an optical modulator capable of modulating transmission data with an appropriate drive signal in accordance with a signal format of a transmission signal.

Means for Solving the Problem

According to one aspect of the present disclosure, there is provided an optical modulator including: a first Mach-Zehnder interferometer (MZI) including a first optical coupler that splits input carrier continuous wave (CW) light into two, a first arm and a second arm respectively connected to two outputs of the first optical coupler, and a second optical coupler that couples the first arm and the second arm and then splits the light again into two to output the light from a first output port and a second output port; a second MZI including a third optical coupler that receives the light output from the second output port and then splits into two, a third arm and a fourth arm respectively connected to two outputs of the third optical coupler, and a fourth optical coupler that couples the third arm and the fourth arm and then outputs the light to a fifth arm; a sixth arm connected to the first output port; an asymmetric optical coupler that couples the fifth arm and the sixth arm and then outputs the light; a first differential output amplifier that differentially amplifies an input data signal; a first drive signal electrode and a second drive signal electrode that control a phase of the light propagated through the first arm and the second arm in accordance with an output of the first differential output amplifier in a push-pull scheme; a first bias electrode that adjusts a phase of at least one of the light propagated through the first arm or the light propagated through the second arm in accordance with an output voltage of a first bias power supply; a delay circuit that delays a correction signal which is the same as the data signal or a signal obtained by inverting a voltage sign of the data signal; a second differential output amplifier that differentially amplifies the correction signal delayed by the delay circuit; a third drive signal electrode and a fourth drive signal electrode that control a phase of the light propagated through the third arm and the fourth arm in accordance with an output of the second differential output amplifier in the push-pull scheme; a second bias electrode that adjusts a phase of at least one of the light propagated through the third arm or the light propagated through the fourth arm in accordance with an output voltage of a second bias power supply; a third bias electrode that adjust a phase of at least one of the light propagated through the sixth arm or the light propagated through the fifth arm in accordance with an output voltage of a third bias power supply; a first gain adjustment circuit and a second gain adjustment circuit that respectively adjust output amplitudes of the first differential output amplifier and the second differential output amplifier; and a first bias adjustment circuit, a second bias adjustment circuit, and a third bias adjustment circuit that respectively adjust output voltages of the first bias power supply, the second bias power supply, and the third bias power supply, wherein as an operating mode of an own apparatus, one of a first operating mode in which linearity of a light intensity of light output by the own apparatus is increased and a second operating mode in which linearity of an amplitude of an optical electric field of the light output by the own apparatus is increased is selectable, the light output from the first output port and the light output from the second output port are light beams of which light intensities are reciprocally changed, the asymmetric optical coupler outputs light having an optical electric field obtained by adding an optical electric field output from the sixth arm and an optical electric field output from the fifth arm after applying a predetermined ratio to each of the optical electric fields, and the first bias adjustment circuit adjusts the output voltage of the first bias power supply so that an optical path length difference between the first arm and the second arm becomes 0.25 times a carrier wavelength under a condition that an output of the first differential output amplifier is a zero level in a case where the first operating mode is selected, and adjusts the output voltage of the first bias power supply so that the optical path length difference between the first arm and the second arm becomes 0.5 times the carrier wavelength under the condition that the output of the first differential output amplifier is a zero level in a case where the second operating mode is selected.

In the optical modulator according to the aspect of the present disclosure, the second bias adjustment circuit adjusts the output voltage of the second bias power supply so that an optical path length difference between the third arm and the fourth arm is close to (0.5+0.05) or (0.5−0.05) times a carrier wavelength under a condition that an output of the second differential output amplifier is a zero level in a case where the first operating mode is selected, and adjusts the output voltage of the second bias power supply so that the optical path length difference between the third arm and the fourth arm is close to 0.5 times the carrier wavelength under the condition that the output of the second differential output amplifier is a zero level in a case where the second operating mode is selected.

In the optical modulator according to the aspect of the present disclosure, when a voltage difference between a voltage applied to the first drive signal electrode and a voltage applied to the second drive signal electrode is defined as Vdrive1, a change amount, which is a half-wavelength voltage in a drive signal, of the Vdrive1 required to change an interference intensity at the first output port from the maximum to the minimum is defined as VπDrive1, a voltage difference between a voltage applied to the third drive signal electrode and a voltage applied to the fourth drive signal electrode is defined as Vdrive2, and a change amount, which is a half-wavelength voltage in a drive signal, of the Vdrive2 required to change an interference intensity at the fifth arm from the maximum to the minimum is defined as VπDrive2, the first gain adjustment circuit performs control such that an absolute value of a difference between positive and negative output voltages of the first differential output amplifier does not exceed 0.7×the VπDrive1 in a case where the first operating mode is selected, and performs control such that the absolute value of the difference between the positive and negative output voltages of the first differential output amplifier does not exceed the VπDrive1 in a case where the second operating mode is selected, and the second gain adjustment circuit performs control such that an absolute value of a difference between positive and negative output voltages of the second differential output amplifier does not exceed 0.7×the VπDrive2 in a case where the first operating mode is selected, and performs control such that the absolute value of the difference between the positive and negative output voltages of the second differential output amplifier does not exceed the VπDrive2 in a case where the second operating mode is selected.

According to another aspect of the present disclosure, there is provided an optical modulator including: a fifth optical coupler that splits input carrier CW light into two; a seventh arm and an eighth arm respectively connected to two outputs of the fifth optical coupler; a first modulator that is connected to the seventh arm and modulates an I signal for In-phase-quadrature (IQ) modulation; a second modulator that is connected to the eighth arm and modulate a Q signal for In-phase-quadrature (IQ) modulation; an orthogonal control bias electrode that adjusts a phase of at least one of the light propagated through the seventh arm or the light propagated through the eighth arm in accordance with an output voltage of an orthogonal control bias power supply; and a sixth optical coupler that couples the seventh arm and the eighth arm and output the light, wherein the first modulator and the second modulator are the optical modulators described above.

Effects of the Invention

According to the present disclosure, it is possible to modulate transmission data with an appropriate drive signal in accordance with a signal format of a transmission signal.

BRIEF DESCRIPTION OF DRAWINGS

FIG. 2 is a set of graphs showing specific examples of light input to a fifth optical coupler 32 in a case where an optical path length difference between a P-side arm and an N-side arm of a main MZI 10 is biased to +0.25λ.

FIG. 3 is a set of graphs showing specific examples of light input to the fifth optical coupler 32 in a case where the optical path length difference between the P-side arm and the N-side arm of the main MZI 10 is biased to +0.5λ.

FIG. 4 is a diagram illustrating a specific example of an eye pattern and a histogram of a light intensity obtained in a case where an improvement in linearity of the light intensity I is selected in the optical modulator 1 according to the first embodiment.

FIG. 5 is a diagram illustrating a specific example of an eye pattern and a histogram of a light intensity obtained in an MZI type optical modulator in the related art.

FIG. 6 is a set of tables showing examples of parameters in an operating mode in which linearity of a light intensity I is increased and in an operating mode in which the amplitude $E_A$ of an optical electric field is increased.

FIG. 8 is a set of tables showing specific examples of a bias of the main MZI and a bias of a correction MZI in a first linear optical modulator 62 and a second linear optical modulator 63.

DESCRIPTION OF EMBODIMENTS

First Embodiment

Figure 1:
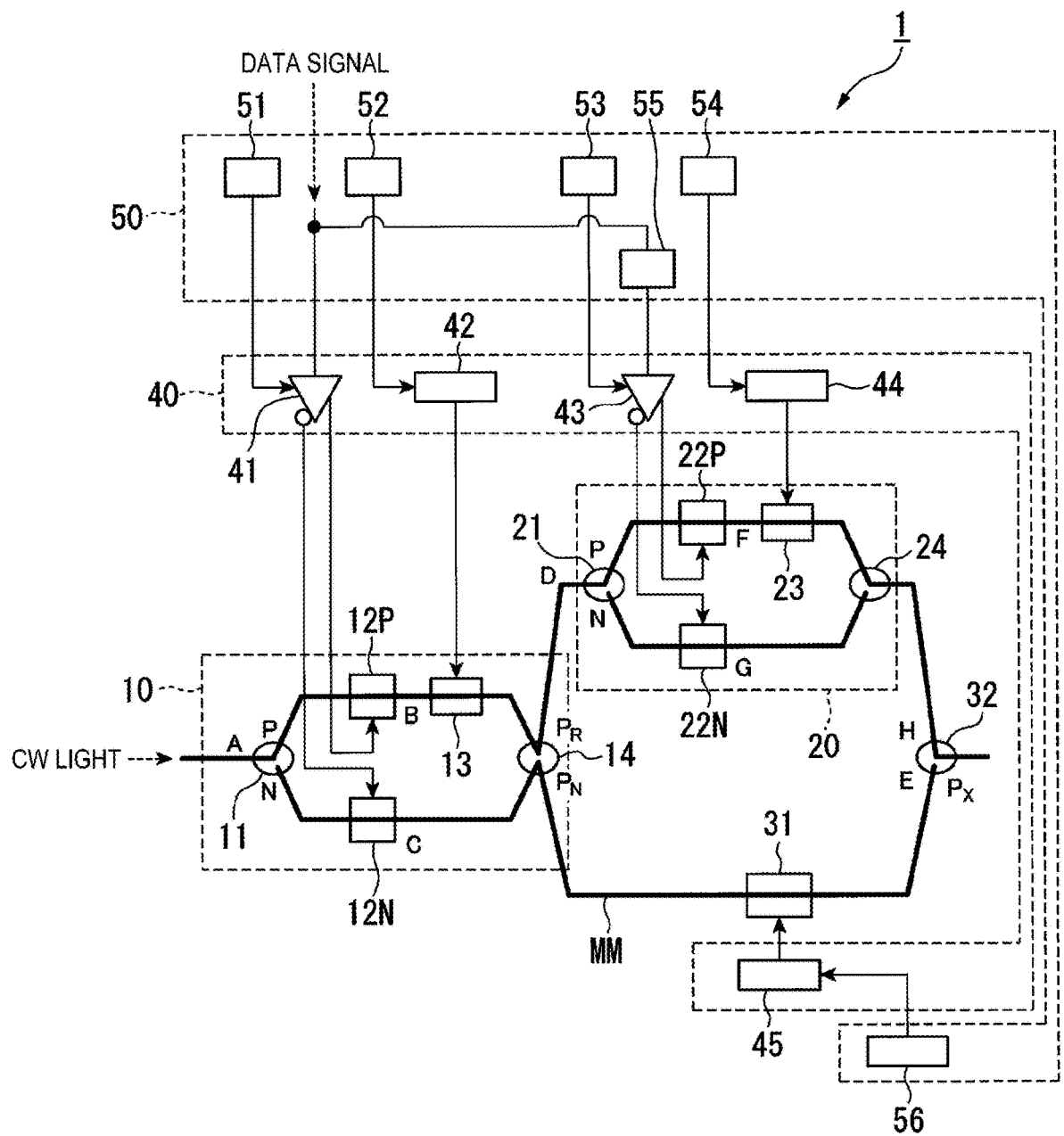
FIG. 1 is a diagram illustrating a specific example of a configuration of an optical modulator 1 according to a first embodiment.

FIG. 1 is a diagram illustrating a specific example of a configuration of the optical modulator 1 according to a first embodiment. The optical modulator 1 according to the first embodiment has the same manner as the optical modulator in the related art (for example, described in Patent Literature 1) in terms of including the main MZI 10 and a correction MZI 20, but is different from the optical modulator in the related art in terms of including a first gain adjustment circuit 51, a second gain adjustment circuit 53, and a second bias adjustment circuit 54 having a function of changing a drive amplitude and a bias voltage in accordance with a case where linearity of the amplitude $E_A$ of an optical electric field is valued and a case where linearity of the light intensity I is valued.

Figure 9:
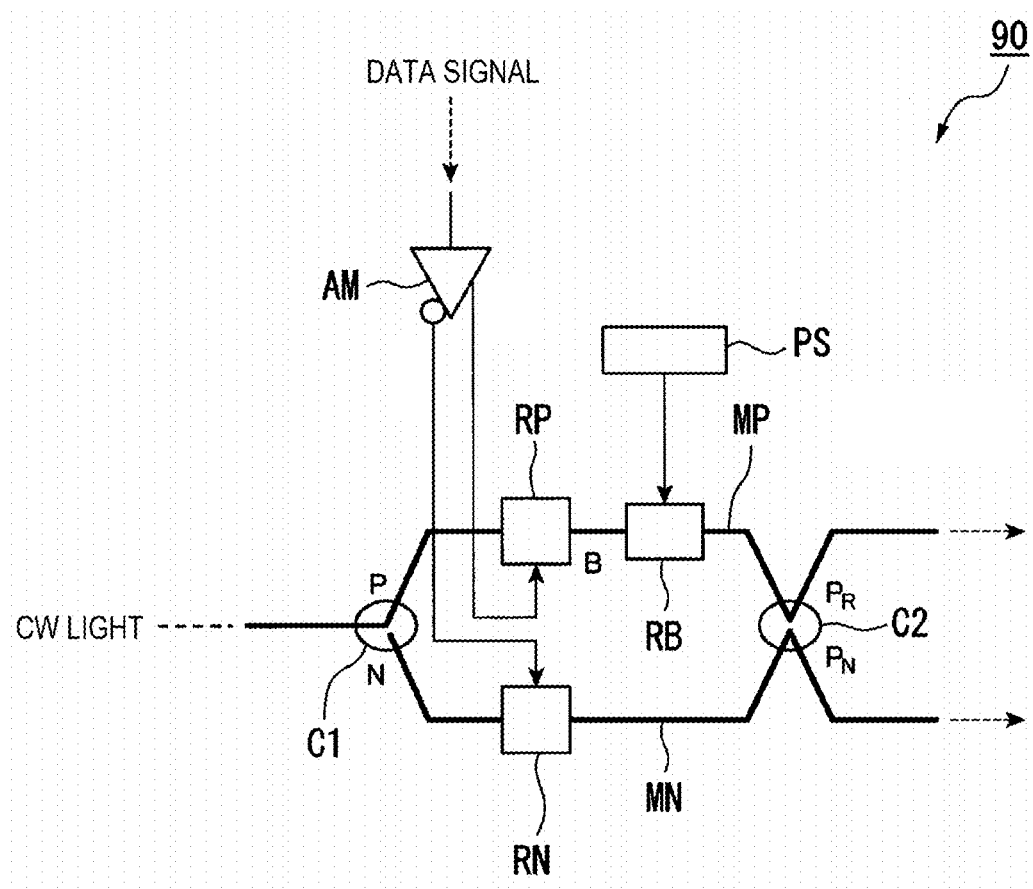
FIG. 9 is a diagram illustrating a configuration example of the MZI type optical modulator 90 in the related art.
Figure 10:
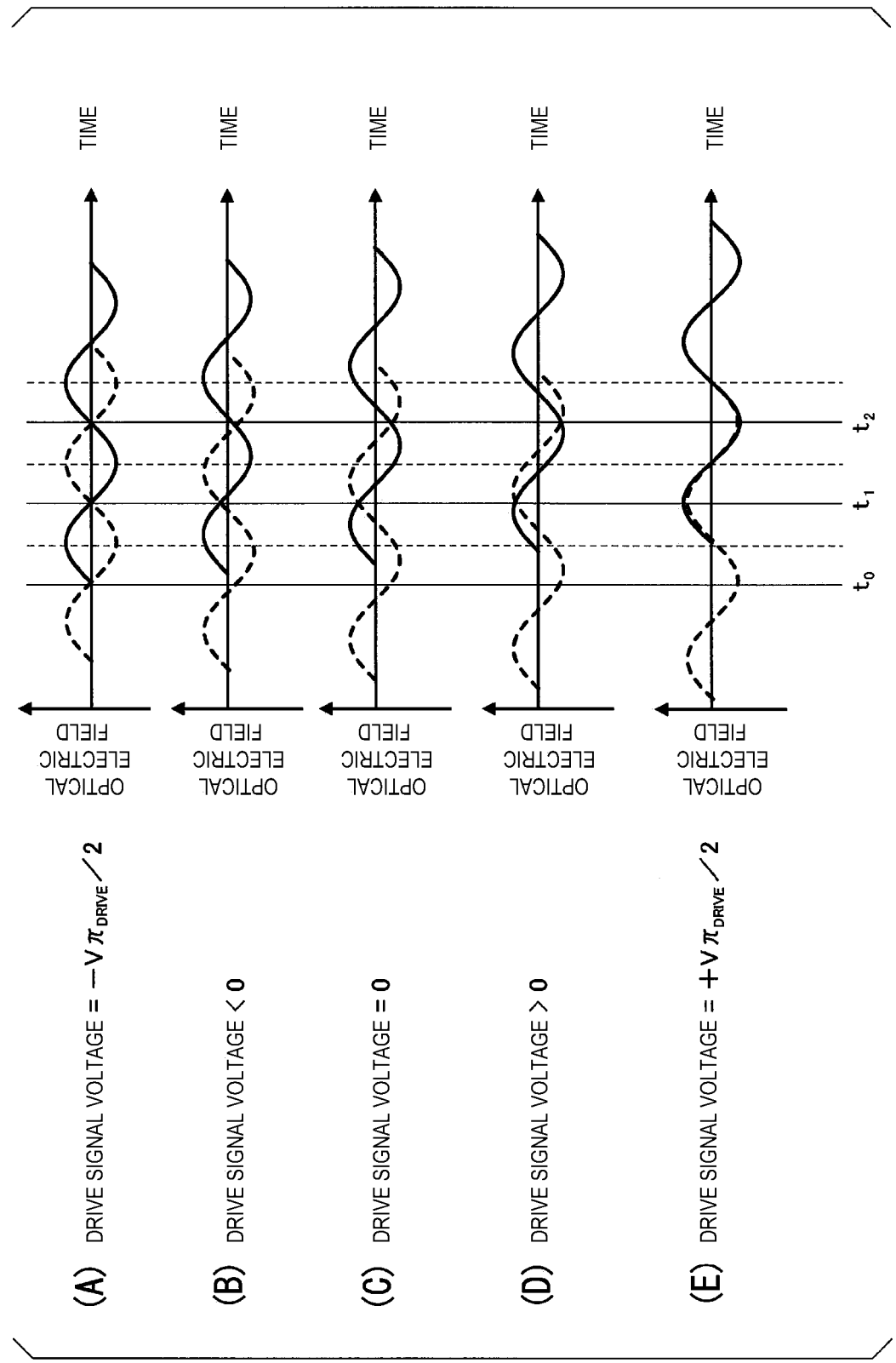
FIG. 10 is a set of graphs schematically showing light output from an output port of the MZI type optical modulator 90 in the related art.

The main MZI 10 is basically the same as the Mach-Zehnder interferometer (MZI) type optical modulator 90 in the related art illustrated in FIG. 9. The main MZI 10 includes a first optical coupler 11, a first P-side drive signal electrode 12P, a first N-side drive signal electrode 12N, a first bias electrode 13, and a second optical coupler 14. In the same manner as the optical modulator in the related art, the second optical coupler 14 includes an output port $P_N$ and an inverting output port $P_R$. In the output port $P_N$ and the inverting output port $P_R$, an intensity of output light is reciprocally changed.

The correction MZI 20 is connected to one of the output port $P_N$ and the inverting output port $P_R$ of the main MZI 10 to correct modulation light output from the main MZI 10. In the first embodiment, the correction MZI 20 is connected to the inverting output port $P_R$ of the main MZI 10.

The correction MZI 20 includes a third optical coupler 21, a second P-side drive signal electrode 22P, a second N-side drive signal electrode 22N, a second bias electrode 23, and a fourth optical coupler 24. The modulation light input into the correction MZI 20 is split into two types of a P-side arm and an N-side arm by the third optical coupler 21. The second P-side drive signal electrode 22P is disposed on the P-side arm, and the second N-side drive signal electrode 22N is disposed on the N-side arm.

The second P-side drive signal electrode 22P and the second N-side drive signal electrode 22N change a phase of the modulation light propagated through the P-side arm and the N-side arm depending on a drive signal voltage applied to the correction MZI 20. In the first embodiment, in the same manner as the main MZI 10, the second P-side drive signal electrode 22P and the second N-side drive signal electrode 22N delay the phase at a positive voltage and advance the phase at a negative voltage. Further, in the same manner as the main MZI 10, a drive signal is applied to the correction MZI 20 in a push-pull scheme.

In the P-side arm of the correction MZI 20, the second bias electrode 23 is disposed at a stage after the second P-side drive signal electrode 22P. The second bias electrode 23 finely adjusts the phase of the modulation light propagated through the P-side arm by being applied with a bias voltage for the correction MZI 20.

The P-side arm and the N-side arm are coupled by the fourth optical coupler 24, and the modulation light beams propagated through the respective arms are coupled by the fourth optical coupler 24. The coupled modulation light is output from the correction MZI 20 to a correction signal arm. The correction signal arm is an arm which connects the fourth optical coupler 24 and the fifth optical coupler 32.

The third bias electrode 31 is connected to one port, to which the correction MZI 20 is not connected, of the main MZI 10 output port $P_N$ and the inverting output port $P_R$. That is, in the first embodiment, the third bias electrode 31 is connected to the output port $P_N$ of the main MZI 10. The third bias electrode 31 corrects the phase of the modulation light output from the main MZI 10 by the third bias power supply 45 applying a bias voltage.

The fifth optical coupler 32 is an asymmetric optical coupler having two-input and one-output. The asymmetric optical coupler is an optical coupler which adds optical electric fields of two input modulation light beams and outputs the resultant light. The asymmetric optical coupler has a function of adding at a ratio of 1 to X. The asymmetric optical coupler can evenly add the input optical electric fields. The modulation light output from the correction MZI 20 and propagated through the correction signal arm and the modulation light propagated through a main signal arm and passing through the third bias electrode 31 are input to the fifth optical coupler 32. The fifth optical coupler 32 couples the input modulation light beams at a predetermined ratio and outputs the light. The main signal arm is an arm which connects the output port $P_N$ and the fifth optical coupler 32.

The drive system 40 includes a first differential output amplifier 41, a first bias power supply 42, a second differential output amplifier 43, a second bias power supply 44, and a third bias power supply 45. The second differential output amplifier 43 generates a drive signal for the correction MZI 20 by differentially amplifying a correction signal with the second differential output amplifier 43. The correction signal is the same signal as a data signal or a signal obtained by inverting the sign of the data signal. In the first embodiment, the correction signal and the data signal have the same sign. The first differential output amplifier 41 and the second differential output amplifier 43 typically block a DC component as described above, so that the correction signal and the data signal become signals swinging from positive and to negative based on zero (a GND level).

The control system 50 includes a first gain adjustment circuit 51, a first bias adjustment circuit 52, a second gain adjustment circuit 53, a second bias adjustment circuit 54, a delay circuit 55, and a third bias adjustment circuit 56. The first gain adjustment circuit 51 can change a gain of the first differential output amplifier 41. The first bias adjustment circuit 52 can change a bias voltage applied to the first bias electrode 13 of the main MZI 10 by the first bias power supply 42. The third bias adjustment circuit 52 can change the bias voltage applied to the third bias electrode 31 by the third bias electrode 45.

Further, the second gain adjustment circuit 53 can change a gain of the second differential output amplifier 43. The second bias adjustment circuit 54 can change the bias voltage applied to the second bias electrode 23 of the correction MZI 20 by the second bias power supply 44.

The delay circuit 55 delays the correction signal by a predetermined time (hereinafter, referred to as "delay time").

This delay time is set equal to a delay time of light from the first P-side drive signal electrode 12P or the first N-side drive signal electrode 12N (from the point B or the point C in FIG. 1) to the second P-side drive signal electrode 22P or the second N-side drive signal electrode 22N (up to the point F or the point G in FIG. 1).

Next, a method of optimizing linearity of the light intensity I in the optical modulator 1 according to the first embodiment will be described. In the following, for simplicity, the $V\pi_{DRIVE}$ at the drive signal voltage for the main MZI 10 and the $V\pi_{DRIVE}$ at the drive signal voltage for the correction MZI 20 are equal, and both are referred to as $V\pi_{DRIVE}$.

Figure 11:
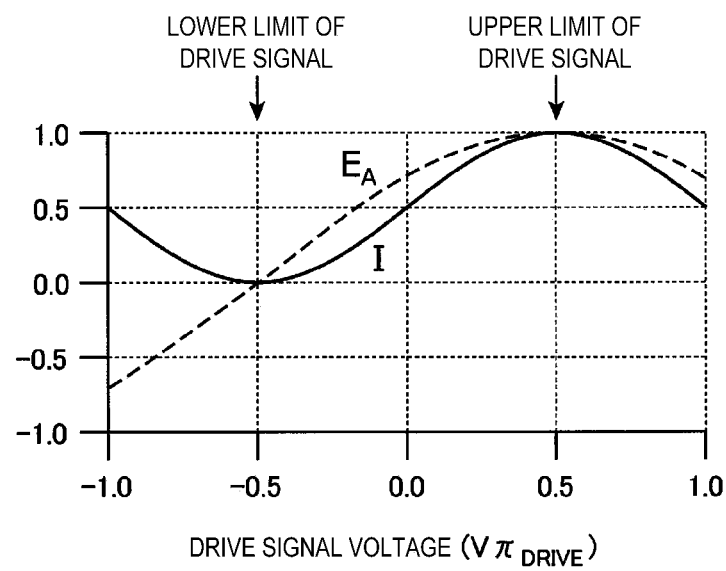
FIG. 11 is a graph showing the amplitude $E_A$ of an optical electric field and the light intensity I output from the output port of the MZI type optical modulator 90 in the related art, as a function of a drive signal voltage.

The main MZI 10 biases an optical path length difference between the P-side arm and the N-side arm in the main MZI 10 to 0.25λ by using the first bias adjustment circuit 52 and the first bias power supply 42. Light observed at the point E in FIG. 1 is shown in the graph (A) in FIG. 2. This is the same as illustrated in FIG. 11. Here, non-essential coefficients are omitted. The horizontal axis represents a drive signal voltage normalized with $V\pi_{DRIVE}$. When the horizontal axis is −0.5, the light intensity I at the point E becomes zero, and when the horizontal axis is +0.5, the light intensity I at the point E is the maximum value of 1. In a region in which an absolute value of the horizontal axis is equal to or less than 0.5, the amplitude $E_A$ of the optical electric field is always positive. Meanwhile, as the light intensity is inverted at the inverting output port $P_R$ as described above, the light intensity I at the point D in FIG. 1 becomes the maximum value of 1 when the horizontal axis is −0.5, and the light intensity I at the point D is zero when the horizontal axis is +0.5.

The correction MZI 20 biases an optical path length difference between the P-side arm and the N-side arm in the correction MZI 20 to +1.1λ/2=0.55λ by using the second bias adjustment circuit 54 and the second bias power supply 44. That is, when a drive signal voltage for the correction MZI is 0, a value obtained by subtracting an optical path length from the point D on the inverting output port $P_R$ of the main MZI 10 to the point H on the correction signal arm via the N-side arm of the correction MZI 20, from the point D to the point H on the correction signal arm via the P-side arm of the correction MZI 20 is set to be 0.55λ.

The graph (B) in FIG. 2 shows the light intensity I and the amplitude $E_A$ of the optical electric field observed at the point H in FIG. 1. When the drive signal voltage for the main MZI 10 and the drive signal voltage for the correction MZI 20 normalized with $V\pi_{DRIVE}$ are near +0.3 and −0.3, the sign of the amplitude $E_A$ of the optical electric field is reversed.

The optical electric field at the point H and the optical electric field at the point E are added at a ratio of approximately 1 to 0.4 by the fifth optical coupler 32, which is an asymmetric optical coupler (this ratio is a ratio of the optical electric field and is not the ratio of the intensity), and is output from a modulator output port $P_X$. At this time, the voltage applied to the third bias electrode 31 by the third bias power supply 45 is set to maximize interference efficiency by the fifth optical coupler 32.

When the drive signal voltage for the main MZI 10 normalized with $V\pi_{DRIVE}$ and the drive signal voltage for the correction MZI 20 are +0.3, the fifth optical coupler 32 adds the optical electric field at the point E and the optical electric field at the point H, which are opposite in phase to each other, and the light intensity I is suppressed.

When the drive signal voltage for the main MZI 10 normalized with $V\pi_{DRIVE}$ and the drive signal voltage for the correction MZI 20 are near −0.3, the fifth optical coupler 32 adds the optical electric field at the point E and the optical electric field at the point H, which have the same phase, and the light intensity I increases.

The graph (C) in FIG. 2 shows the light intensity I and the amplitude $E_A$ of the optical electric field at the modulator output port $P_X$. In a range of −0.5 to +0.5 in which the drive signal voltage for the main MZI 10 and the drive signal voltage for the correction MZI 20 are normalized with the $V\pi_{DRIVE}$, linearity of the light intensity I is improved by linearity at the point E. In addition, even if the range in which the drive signal voltage for the main MZI 10 and the drive signal voltage for the correction MZI 20 normalized with $V\pi_{DRIVE}$ is −0.7 to +0.7, no turn-back occurs in the light intensity I. That is, as compared with the MZI type optical modulator 90 in the related art illustrated in FIG. 9, the degree of freedom of drive amplitude increases.

The drive amplitude for the main MZI 10 is set to not exceed $-0.7V\pi_{DRIVE}$ to $+0.7V\pi_{DRIVE}$ in the first gain adjustment circuit 51 and the first differential output amplifier 41. The drive amplitude for the correction MZI 20 is set to be the same as the drive amplitude for the main MZI 10 by the second gain adjustment circuit 53 and the second differential output amplifier 43.

Next, a method of optimizing linearity of the amplitude $E_A$ of the optical electric field in the optical modulator 1 according to the first embodiment will be described. The main MZI 10 biases the optical path length difference between the P-side arm and the N-side arm in the main MZI 10 to 0.5λ by using the first bias adjustment circuit 52 and the first bias power supply 42 (biases to a null point in more general terms).

Figure 13:
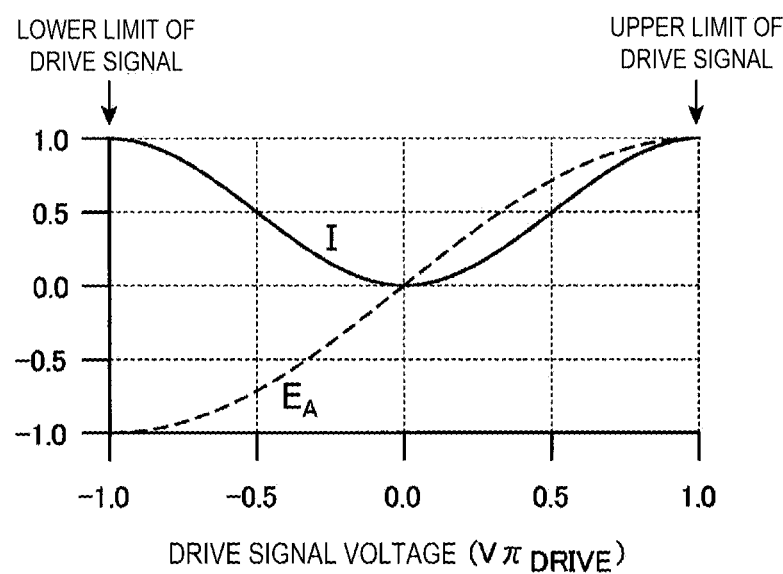
FIG. 13 is a graph showing a specific example of the light intensity I and the amplitude $E_A$ of the optical electric field in a case where upper and lower limits of the drive signal voltage are respectively set to $+V\pi_{DRIVE}$ and $-V\pi_{DRIVE}$ in the MZI type optical modulator 90 in the related art.

The light observed at the point E in FIG. 1 is illustrated in the graph (A) in FIG. 3. This is the same as illustrated in FIG. 13. Here, non-essential coefficients are omitted. The horizontal axis represents a drive signal voltage normalized with $V\pi_{DRIVE}$. When the horizontal axis is −1.0, the amplitude $E_A$ of the optical electric field at the point E is −1 which is the minimum value, and when the horizontal axis is +1.0, the amplitude $E_A$ of the optical electric field at the point E is 1 which is the maximum value. When the horizontal axis is 0, the amplitude $E_A$ of the optical electric field is also 0.

The correction MZI 20 biases an optical path length difference between the P-side arm and the N-side arm in the correction MZI 20 to 0.5λ (=+1.0λ/2) by using the second bias adjustment circuit 54 and the second bias power supply 44. That is, when a drive signal voltage for the correction MZI 20 is 0, a value obtained by subtracting an optical path length from the point D on the inverting output port $P_R$ of the main MZI 10 to the point H on the correction signal arm via the N-side arm of the correction MZI 20, from the point D to the point H on the correction signal arm via the P-side arm of the correction MZI 20 is set to be 0.5λ.

The graph (B) in FIG. 3 illustrates the light intensity I and the amplitude $E_A$ of the optical electric field observed at the point H in FIG. 1. The sign of the amplitude $E_A$ of the optical electric field is reversed around a time when the drive signal voltage for the main MZI 10 and the drive signal voltage for the correction MZI 20 normalized with $V\pi_{DRIVE}$ are 0. In addition, the sign is an inverse sign of the amplitude $E_A$ of the optical electric field observed at the point E in FIG. 1.

The optical electric field at the point H and the optical electric field at the point E are added by a fifth optical coupler 32 at a ratio of approximately 1 to 0.3 and output from the modulator output port $P_X$. At this time, the voltage applied to the third bias electrode 31 by the third bias power supply 45 is set to maximize interference efficiency by the fifth optical coupler 32. Phases of the optical electric field at the point E and the optical electric field at the point H are always reversed (the amplitude $E_A$ signs at the E point and point H are reversed) regardless of the drive signal voltage, so that an absolute value of the amplitude $E_A$ is suppressed by the fifth optical coupler 32.

The graph (C) in FIG. 3 shows the light intensity I and the amplitude $E_A$ of the optical electric field at the modulator output port $P_X$.

In a range of −1 to +1 in which the drive signal voltage for the main MZI 10 and the drive signal voltage for the correction MZI 20 are normalized with the $V\pi_{DRIVE}$, linearity of the amplitude $E_A$ of the optical electric field is improved by linearity at the point E.

The drive amplitude for the main MZI 10 is set to not exceed $-V\pi_{DRIVE}$ to $+V\pi_{DRIVE}$ in the first gain adjustment circuit 51 and the first differential output amplifier 41. The drive amplitude for the correction MZI 20 is set to be the same as the drive amplitude for the main MZI 10 by the second gain adjustment circuit 53 and the second differential output amplifier 43.

As described above, in the first exemplary embodiment, by only changing the drive amplitude and the bias voltage without changing the configuration of the optical circuit, it is possible to select improvement of the linearity in the amplitude $E_A$ of the optical electric field or improvement of the linearity in the light intensity I.

Figure 12:
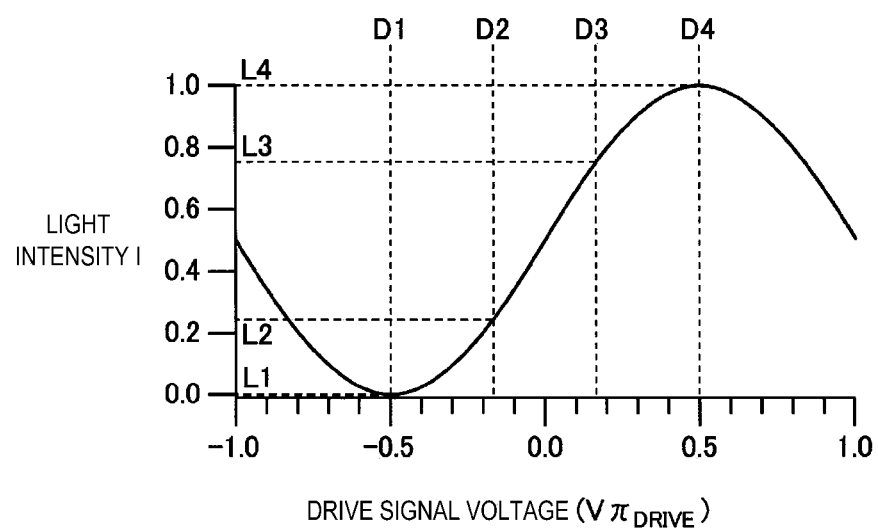
FIG. 12 is a graph showing a specific example of a level of a light intensity obtained when a PAM modulation signal of four values is output in the MZI type optical modulator 90 in the related art.

By using the optical modulator 1 described in the first embodiment, the result of generating a light intensity modulation signal of four values (PAM of four values) by selecting the improvement in the linearity of the light intensity I, and measuring an eye pattern and a histogram of a light intensity obtained by square detection is illustrated in FIG. 4. In addition, a result of performing the same measurement by using the single MZI type optical modulator 90 in the related art illustrated in FIG. 9 is illustrated in FIG. 5. Both drive amplitudes are set to $V\pi_{DRIVE}$. When comparing the two, the measurement result in the related art (FIG. 5), as illustrated in FIG. 12, intervals of four light intensity levels are not equal and the interval between the two central values is widened. In contrast, linearity is improved in the measurement result using the optical modulator 1 according to the first embodiment (FIG. 4).

An operation example in a case where the improvement in the linearity of the amplitude $E_A$ of the optical electric field is selected by using the optical modulator 1 described in the first embodiment will be described with reference to Non-Patent Literature 2 or Patent Literature 1. Meanwhile, in the related arts and the present disclosure, the expression of the coupling ratio of the asymmetric coupler is different. In the first embodiment, the optical electric field at the point D and the optical electric field at the point E in FIG. 1 are added by the asymmetric optical coupler at the ratio of approximately 1 to 0.3, but a ratio of intensity is rewritten as $1^2$ to $0.3^2=1$ to $0.09=1-0.083$ to $0.083$, so that a value of a light intensity coupling ratio r used in Patent Literature 1 is 0.083 in this example.

Hereinafter, a modification example of the first example embodiment will be described. In the first embodiment, it is assumed that a positive voltage is applied to the drive signal electrode to delay the phase and a negative voltage is applied to the drive signal electrode to advance the phase, but the opposite may occur depending on the configuration of the modulator. In addition, the first embodiment does not include logic inversion of the drive signal voltage for the main MZI 10 and the drive signal voltage for the correction MZI 20, but the operation can be performed even in a case of the logic inversion. By periodicity of the main MZI 10 and the correction MZI 20, there may be another optimum solution for each bias voltage.

The table (A) in FIG. 6 showing an example of each parameter in an operating mode in which linearity of a light intensity I is increased, and the table (B) shows each parameter in an operating mode in which the amplitude $E_A$ of the optical electric field is increased.

The "logic inversion of main and correction" in the table (A) in FIG. 6 indicates whether or not a logic of a drive signal voltage for the main MZI 10 and a drive signal voltage for the correction MZI 20 is inverted. The "coupling ratio of asymmetric coupler" is a ratio of combining the optical electric field at the point H and the optical electric field at the point E as described above. For example, the "−1 to 0.4" described in the table (A) in FIG. 6 includes that modulation light propagated through a main signal arm MM in FIG. 1 is delayed by a propagation delay time of the correction MZI 20 and a phase is changed by π[rad] by the third bias power supply 45 and the third bias electrode 31 (after adding a delay corresponding to half of a carrier wavelength in terms of wavelength), and is input to an asymmetric coupler. The reason why a negative sign is attached is that the phase change of π[rad] is equivalent to sign inversion of the amplitude $E_A$ of the optical electric field, as described above.

All of the numerical values shown in FIG. 6 are typical values and are not necessarily limited to these values. For example, in a case where not only the optical modulator but also a non-linear response of the first differential output amplifier 41 or the second differential output amplifier 43 is not negligible, the numerical value may be changed and modified slightly so that the optimum linearity can be obtained throughout the system.

In addition, in the description above, $V\pi_{DRIVE}$ of the main MZI 10 and $V\pi_{DRIVE}$ of the correction MZI 20 are the same. When the two are different from each other, for example, in a case where $V\pi_{DRIVE}$ of the correction MZI 20 is Y times greater than $V\pi_{DRIVE}$ of the main MZI 10, the drive amplitude for the correction MZI 20 may be Y times the drive amplitude for the main MZI 10 and the magnitude of the drive signal with respect to each $V\pi_{DRIVE}$ may be kept constant.

Second Embodiment

Figure 7:
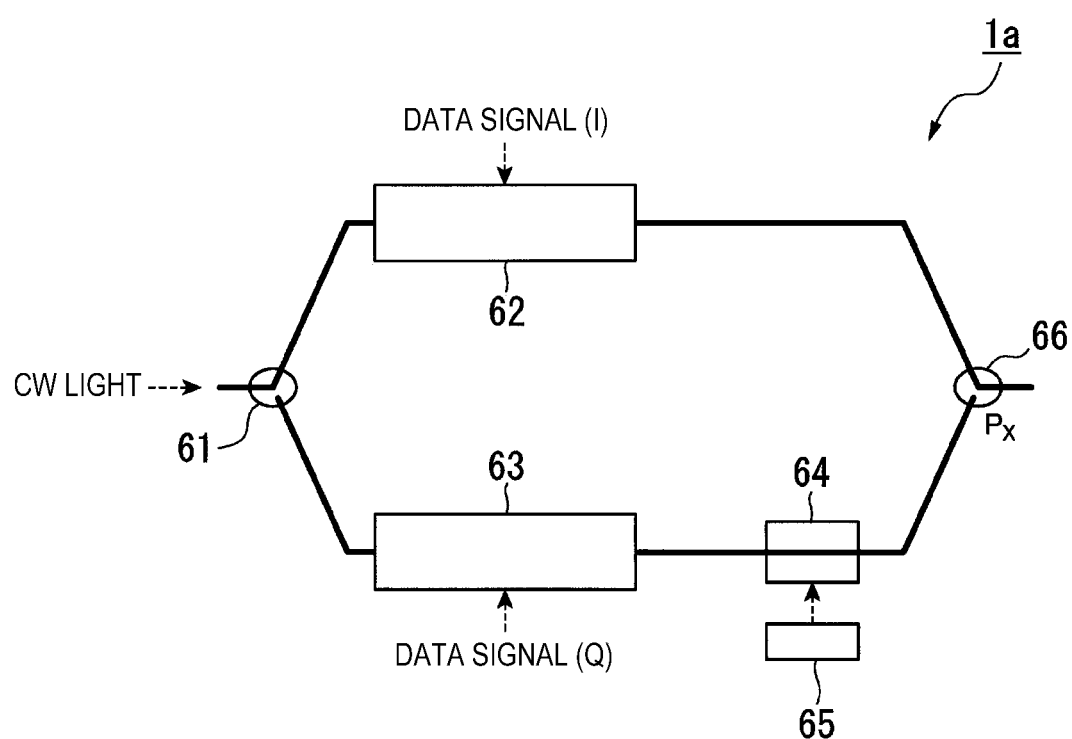
FIG. 7 is a diagram illustrating a specific example of a configuration of an optical modulator 1a according to a second embodiment.

FIG. 7 is a diagram illustrating a specific example of a configuration of an optical modulator 1a according to a second embodiment. The optical modulator 1a is a modulator which performs IQ modulation, and has a configuration in which an MZI type optical modulator is combined in a nest type. The optical modulator 1a includes a first optical coupler 61, a first linear optical modulator 62, a second linear optical modulator 63, an orthogonal control bias electrode 64, an orthogonal control bias power supply 65 and a second optical coupler 66. The first linear optical modulator 62 and the second linear optical modulator 63 have the same manner as the optical modulator 1 of the first embodiment.

CW light is split into two types of an I-side arm and a Q-side arm in the first optical coupler 61. The I-side arm is connected to the first linear optical modulator 62 and the Q-side arm is connected to the second linear optical modulator 63.

The first linear optical modulator 62 and the second linear optical modulator 63 are respectively driven by a data signal (I) and a data signal (Q). The output light beams of the first linear optical modulator 62 and the second linear optical modulator 63 are coupled by the second optical coupler 66 and output from the modulator output port $P_X$, and a phase difference of both is adjusted by applying an output voltage of the orthogonal control bias power supply 65 to the orthogonal control bias electrode 64 and controlling a delay time.

In the second embodiment, it is also possible to select one of an operating mode in which linearity of the light intensity I is increased (one example of a first operating mode) and an operating mode in which linearity of the amplitude $E_A$ of the optical electric field is increased.

First, a case where the operating mode for increasing the linearity of the amplitude $E_A$ of the optical electric field is selected to generate an optical QAM signal will be described. A bias of the main MZI and a bias of the correction MZI in the first linear optical modulator 62 and the second linear optical modulator 63 may have the same manner as that illustrated in the table (B) in FIG. 6. A difference between optical path lengths of the I-side arm and the Q-side arm viewed from the modulator output port $P_X$ is adjusted by the orthogonal control bias power supply 65 to be ±0.25λ when a drive signal voltage is at a zero level. This is a state in which phases of light propagated through the I-side arm and light propagated through the Q-side arm are orthogonal, and intensities of both do not interfere with each other.

When the data signal (I) and the data signal (Q) are respectively multi-level signal having n values, an optical $n^2$-QAM signal is generated at the output port. The linearity of the amplitude $E_A$ of the optical electric field is ensured by the first linear optical modulator 62 and the second linear optical modulator 63, so that $n^2$ symbols are arranged at equal intervals even if the drive amplitude is increased in the generated constellation.

Next, a case where a light PAM signal is generated by selecting the operating mode (an example of a second operating mode) in which the linearity of the light intensity I is increased. FIG. 8 shows a bias of the main MZI and a bias of the correction MZI in the first linear optical modulator 62 and the second linear optical modulator 63 in this case. The data signal (Q) is always a zero level. The output of the first differential output amplifier and the second differential output amplifier (see FIG. 1) included in the second linear optical modulator 63 is a zero level. The bias of the main MZI and the bias of the correction MZI in the first linear optical modulator 62 are biased to 0.5λ (biased to a null point), so that the light propagated through the Q-side arm becomes extinct in the second linear optical modulator 63. The output voltage of the orthogonal control bias power supply 65 may be any value. The light output from the output port is essentially the same as the first embodiment, so that it is possible to obtain a linear PAM signal having superior linearity such as that illustrated in FIG. 4 even in the optical modulator 1a according to the second embodiment.

The embodiments of the present disclosure are described in detail above with reference to the drawings, but the specific configuration is not limited to this embodiment, and includes a design or the like within a range not departing from the gist of the present disclosure.

In the main MZI 10 illustrated in FIG. 1, the P-side arm connected to the first optical coupler 11 is an example of a first arm of the present disclosure. The N-side arm connected to the first optical coupler 11 is an example of a second arm in the present disclosure. The first P-side drive signal electrode 12P is an example of a first drive signal electrode according to the present disclosure. The first P-side drive signal electrode 12N is an example of a second drive signal electrode according to the present disclosure. The first optical coupler 11 is an example of a first optical coupler of the present disclosure. The second optical coupler 14 is an example of a second optical coupler of the present disclosure. The output port on the $P_N$ side of the second optical coupler 14 is an example of a first output port of the present disclosure. The output port on the $P_R$ side of the second optical coupler 14 is an example of a second output port of the present disclosure.

Further, in the correction MZI 20, the P-side arm connected to the third optical coupler 21 is an example of a third arm of the present disclosure. The N-side arm connected to the third optical coupler 21 is an example of a fourth arm in the present disclosure. The second P-side drive signal electrode 22P is an example of a third drive signal electrode according to the present disclosure. The second P-side drive signal electrode 22N is an example of a fourth drive signal electrode according to the present disclosure. The third optical coupler 21 is an example of a third optical coupler of the present disclosure. The fourth optical coupler 24 is an example of a fourth optical coupler of the present disclosure.

In addition, in the optical modulator 1, the correction signal arm is an example of a fifth arm of the present disclosure. The main signal arm is an example of a sixth arm in the present disclosure. Further, in the optical modulator 1a, the I-side arm connected to the first optical coupler 61 is an example of a seventh arm of the present disclosure. The Q-side arm connected to the first optical coupler 61 is an example of an eighth arm in the present disclosure. The first linear optical modulator 62 is an example of a first modulator in the present disclosure. The second linear optical modulator 63 is an example of a second modulator in the present disclosure. The first optical coupler 61 is an example of a fifth optical coupler of the present disclosure. The second optical coupler 66 is an example of a sixth optical coupler of the present disclosure.

INDUSTRIAL APPLICABILITY

The present disclosure is applicable to an optical transmitter which modulates optical signals and transmits data.

REFERENCE SIGNS LIST 1, 1a Optical modulator
10 Main MZI (Mach-Zehnder interferometer)
11 First optical coupler
12N First N-side drive signal electrode
12P First P-side drive signal electrode
13 First bias electrode
14 Second optical coupler
20 Correction MZI
21 Third optical coupler
22N Second N-side drive signal electrode
22P Second P-side drive signal electrode
23 Second bias electrode
24 Fourth optical coupler
31 Third bias electrode
32 Fifth optical coupler
40 Drive system
41 First differential output amplifier
42 First bias power supply
43 Second differential output amplifier
44 Second bias power supply
45 Third bias power supply
50 Control system
51 First gain adjustment circuit
52 First bias adjustment circuit
53 Second gain adjustment circuit
54 Second bias adjustment circuit
55 Delay circuit
56 Third bias adjustment circuit
61 First optical coupler
62 First linear optical modulator
63 Second linear optical modulator
64 Orthogonal control bias electrode
65 Orthogonal control bias power supply
66 Second optical coupler
90 MZI type optical modulator in related art
AM Differential output amplifier
MN N-side arm
MP P-side arm
PN Output port
PR Inverting output port
PS Bias power supply
RB Bias electrode
RN Side drive signal electrode
RP Side drive signal electrode

The invention claimed is:
1. An optical modulator comprising:
a first Mach-Zehnder interferometer (MZI) comprising:
a first optical coupler configured to split input carrier continuous wave (CW) light into two,
a first arm and a second arm respectively connected to two outputs of the first optical coupler, and
a second optical coupler configured to couple the first arm and the second arm and then split the light again into two to output the light from a first output port and a second output port; a second MZI comprising
a third optical coupler configured to receive the light output from the second output port and then split into two,
a third arm and a fourth arm respectively connected to two outputs of the third optical coupler, and
a fourth optical coupler configured to couple the third arm and the fourth arm and then output the light to a fifth arm;
a sixth arm connected to the first output port;
an asymmetric optical coupler configured to couple the fifth arm and the sixth arm and then output the light;
a first differential output amplifier configured to differentially amplify an input data signal;
a first drive signal electrode and a second drive signal electrode configured to control a phase of the light propagated through the first arm and the second arm in accordance with an output of the first differential output amplifier in a push-pull scheme;
a first bias electrode configured to adjust a phase of at least one of the light propagated through the first arm or the light propagated through the second arm in accordance with an output voltage of a first bias power supply;
a delay circuit configured to delay a correction signal which is the same as the data signal or a signal obtained by inverting a voltage sign of the data signal;
a second differential output amplifier configured to differentially amplify the correction signal delayed by the delay circuit;
a third drive signal electrode and a fourth drive signal electrode configured to control a phase of the light propagated through the third arm and the fourth arm in accordance with an output of the second differential output amplifier in the push-pull scheme; a second bias electrode configured to adjust a phase of at least one of the light propagated through the third arm or the light propagated through the fourth arm in accordance with an output voltage of a second bias power supply;

a third bias electrode configured to adjust a phase of at least one of the light propagated through the sixth arm or the light propagated through the fifth arm in accordance with an output voltage of a third bias power supply;

a first gain adjustment circuit and a second gain adjustment circuit configured to respectively adjust output amplitudes of the first differential output amplifier and the second differential output amplifier; and a first bias adjustment circuit, a second bias adjustment circuit, and a third bias adjustment circuit configured to respectively adjust output voltages of the first bias power supply, the second bias power supply, and the third bias power supply, wherein as an operating mode of an own apparatus, one of a first operating mode in which linearity of a light intensity of light output by the own apparatus is increased and a second operating mode in which linearity of an amplitude of an optical electric field of the light output by the own apparatus is increased is selectable, the light output from the first output port and the light output from the second output port are light beams of which light intensities are reciprocally changed, the asymmetric coupler outputs light having an optical electric field obtained by adding an optical electric field output from the sixth arm and an optical electric field output from the fifth arm after applying a predetermined ratio to each of the optical electric fields, and the first bias adjustment circuit adjusts the output voltage of the first bias power supply so that an optical path length difference between the first arm and the second arm becomes 0.25 times a carrier wavelength under a condition that an output of the first differential output amplifier is a zero level in a case where the first operating mode is selected, and adjusts the output voltage of the first bias power supply so that the optical path length difference between the first arm and the second arm becomes 0.5 times the carrier wavelength under the condition that the output of the first differential output amplifier is a zero level in a case where the second operating mode is selected.

2. The optical modulator according to claim 1, wherein the second bias adjustment circuit adjusts the output voltage of the second bias power supply so that an optical path length difference between the third arm and the fourth arm is close to (0.5+0.05) or (0.5−0.05) times a carrier wavelength under a condition that an output of the second differential output amplifier is a zero level in a case where the first operating mode is selected, and adjusts the output voltage of the second bias power supply so that the optical path length difference between the third arm and the fourth arm is close to 0.5 times the carrier wavelength under the condition that the output of the second differential output amplifier is a zero level in a case where the second operating mode is selected.

3. The optical modulator according to claim 1, wherein when a voltage difference between a voltage applied to the first drive signal electrode and a voltage applied to the second drive signal electrode is defined as Vdrive1, a change amount, which is a half-wavelength voltage in a drive signal, of the Vdrive1 required to change an interference intensity at the first output port from the maximum to the minimum is defined as VπDrive1, a voltage difference between a voltage applied to the third drive signal electrode and a voltage applied to the fourth drive signal electrode is defined as Vdrive2, and a change amount, which is a half-wavelength voltage in a drive signal, of the Vdrive2 required to change an interference intensity at the fifth arm from the maximum to the minimum is defined as VπDrive2, the first gain adjustment circuit performs control such that an absolute value of a difference between positive and negative output voltages of the first differential output amplifier does not exceed 0.7×the VπDrive1 in a case where the first operating mode is selected, and performs control such that the absolute value of the difference between the positive and negative output voltages of the first differential output amplifier does not exceed the VπDrive1 in a case where the second operating mode is selected, and the second gain adjustment circuit performs control such that an absolute value of a difference between positive and negative output voltages of the second differential output amplifier does not exceed 0.7×the VπDrive2 in a case where the first operating mode is selected, and performs control such that the absolute value of the difference between the positive and negative output voltages of the second differential output amplifier does not exceed the VπDrive2 in a case where the second operating mode is selected.

4. An optical modulator comprising:

a fifth optical coupler configured to split input carrier CW light into two;

a seventh arm and an eighth arm respectively connected to two outputs of the fifth optical coupler;

a first modulator configured to be connected to the seventh arm and modulate an I signal for In-phase-quadrature (IQ) modulation;

a second modulator configured to be connected to the eighth arm and modulate a Q signal for In-phase-quadrature (IQ) modulation;

an orthogonal control bias electrode configured to adjust a phase of at least one of the light propagated through the seventh arm or the light propagated through the eighth arm in accordance with an output voltage of an orthogonal control bias power supply; and a sixth optical coupler configured to couple the seventh arm and the eighth arm and output the light, wherein the first modulator and the second modulator are the optical modulators according to claim 1.

5. An optical modulator comprising:

a fifth optical coupler configured to split input carrier CW light into two;

a seventh arm and an eighth arm respectively connected to two outputs of the fifth optical coupler;

a first modulator configured to be connected to the seventh arm and modulate an I signal for In-phase-quadrature (IQ) modulation;

a second modulator configured to be connected to the eighth arm and modulate a Q signal for In-phase-quadrature (IQ) modulation;

an orthogonal control bias electrode configured to adjust a phase of at least one of the light propagated through the seventh arm or the light propagated through the eighth arm in accordance with an output voltage of an orthogonal control bias power supply; and a sixth optical coupler configured to couple the seventh arm and the eighth arm and output the light, wherein the first modulator and the second modulator are the optical modulators according to claim 2.

6. An optical modulator comprising:

a fifth optical coupler configured to split input carrier CW light into two;

a seventh arm and an eighth arm respectively connected to two outputs of the fifth optical coupler;

a first modulator configured to be connected to the seventh arm and modulate an I signal for In-phase-quadrature (IQ) modulation;

a second modulator configured to be connected to the eighth arm and modulate a Q signal for In-phase-quadrature (IQ) modulation;

an orthogonal control bias electrode configured to adjust a phase of at least one of the light propagated through the seventh arm or the light propagated through the eighth arm in accordance with an output voltage of an orthogonal control bias power supply; and a sixth optical coupler configured to couple the seventh arm and the eighth arm and output the light, wherein the first modulator and the second modulator are the optical modulators according to claim 3.

* * * * *